Aug. 6, 1935.  H. T. HALLOWELL, JR  2,010,189
MEANS FOR TESTING METALS
Filed July 30, 1932  2 Sheets—Sheet 1

Inventor:
Howard T. Hallowell, Jr.
by his Attorneys
Howson & Howson

Aug. 6, 1935.  H. T. HALLOWELL, JR  2,010,189
MEANS FOR TESTING METALS
Filed July 30, 1932  2 Sheets-Sheet 2

Inventor
Howard T. Hallowell Jr.
by his Attorneys
Howson & Howson

Patented Aug. 6, 1935

2,010,189

UNITED STATES PATENT OFFICE 2,010,189

MEANS FOR TESTING METALS

Howard T. Hallowell, Jr., Jenkintown, Pa., assignor to Standard Pressed Steel Co., Jenkintown, Pa., a corporation of Pennsylvania Application July 30, 1932, Serial No. 626,982

2 Claims. (Cl. 175—183)

This invention relates to systems for determining the physical and/or chemical characteristics of a metal piece by comparison with a standard metal piece of known characteristics.

The general object of the invention is to provide an improved system which is very accurate in determining the physical and/or chemical characteristics of a metal piece and in which there is provided means for visually indicating the characteristics of the said piece.

A more specific object of the invention is to provide a system which utilizes oscillographic means for producing an image pattern which is symbolic of the characteristics of the metal piece under observation.

With these and other objects in view, the invention in its preferred form consists in the novel features of construction and arrangement of parts illustrated on the accompanying drawings and described hereinafter. In the drawings.

Figure 1:
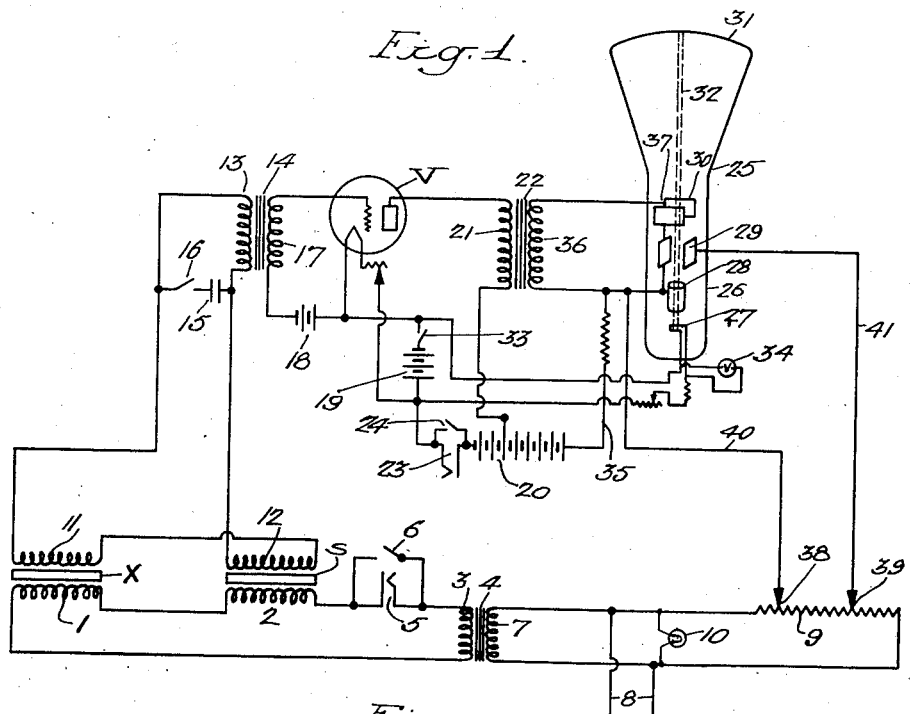
Fig. 1 is a schematic wiring diagram of the system.

Referring to Fig. 1, there is shown at $x$ a piece of magnetic metal, such as steel, the physical characteristics of which it is desired to determine. A standard piece of similar metal is illustrated at $s$, the physical characteristics of this piece being known. A pair of similar primary coils 1 and 2 are serially connected in circuit with the secondary winding 3 of transformer 4. Included in this series circuit, is a jack 5 shunted by a switch 6, the purpose of which will be more clearly apparent hereinafter. The primary 7 of transformer 4 is energized from lines 8 which may be connected to any suitable source of electrical energy (not shown), preferably a 110 volt, 60 cycle alternating-current source, such as is commonly used commercially. There is connected also across line conductors 8 a potentiometer or voltage divider 9, whose purpose will be explained later. It will be apparent that the voltage divider is in parallel relation with the transformer primary 7 so that both these elements are supplied with energy from a common source. A pilot light 10 is also connected across the supply lines to indicate the operative condition of the system.

A second pair of similar coils 11 and 12 are inductively associated respectively with coils 1 and 2. The inductively associated pairs of coils 1, 11 and 2, 12 are arranged so that the unknown piece $x$ and the standard piece $s$ may be conveniently brought into inductive relation with them, as illustrated, so that the metal pieces and coils constitute magnetic core transformers. The important physical characteristics of a piece of magnetic metal, such as hardness, elasticity, tenacity, ductility, freedom from cracks, etc., as well as the chemical characteristics of the piece, directly affect the magnetic characteristics of the piece. It will be quite apparent then that the physical and/or chemical characteristics of the two magnetic pieces will determine the potentials set up across coils 11 and 12 by virtue of any potentials existing across coils 1 and 2.

Coils 11 and 12 are serially connected but in opposed relation as illustrated. The extremities of these coils are connected to the primary 13 of transformer 14. A suitable condenser 15, preferably of two microfarads capacity, and switch 16 are serially connected across the primary winding 13. The transformer secondary winding 17 is connected to the control grid and cathode or filament of an amplifying tube $v$. This tube may take any desired form, but is shown herein as an ordinary three-electrode tube for the sake of simplicity. The usual grid bias, filament supply, and plate or anode supply sources are illustrated respectively at 18, 19 and 20. While these sources are shown herein for the sake of simplicity as separate batteries, the necessary uni-directional potentials may, of course, be derived from a single source, or even from the alternating current source above mentioned by using suitable rectifying and filtering equipment. The plate or output circuits of the amplifier tube is completed through the primary winding 21 of transformer 22 in known fashion. A jack 23 shunted by the switch 24 is provided in this circuit and functions as clearly explained hereinafter.

In accordance with the present invention, there is provided a Braun cathode ray tube 25 comprising the usual glass envelope 26, within which are disposed a cathode 27, an anode 28, and pairs of ray-deflecting plates 29 and 30, the said pairs of plates being arranged in planes at right angles to each other. There is also provided a suitable screen 31, which is preferably located within the glass envelope at the enlarged end thereof, although it is to be understood that this screen may be located outside the glass envelope if desired. The screen may be of any suitable material which will give a clearly defined image of the path of the ray which is indicated by broken lines at 32.

The cathode 27 may be supplied with energy from source 19 and to this end suitable connections are provided as illustrated. A suitable switch 33 controls the supply of energy to the cathode circuit. A volt meter 34 is preferably connected across the supply leads of cathode 27 to indicate at all times that the proper voltage is applied to that cathode. The desired anode potential for the cathode ray tube may be derived from the source 20 via conductor 35. The secondary winding 36 of transformer 22 has one extremity connected to one of plates 30 at 37, while its other extremity is connected to anode 28, one of plate 29 and the other of plates 30. Movable contacts 38 and 39 form a part of the voltage divider 9 and engage the resistance thereof at adjustable spaced points. Contact 38 is connected, via conductor 40, to anode 28 and the plates 29 and 30 to which the lower extremity of secondary 36 is connected. Contact 39 is connected, via conductor 41, to the other of plates 29.

By virtue of this arrangement, any voltage or potential appearing across secondary 36 is applied between plates 30, while any potential appearing across the effective portion of the resistance of voltage divider 9 is applied between plates 29. With the cathode ray tube in operation, the path of the ray will depend upon these respective voltages, as is well known. Since supply lines 8 are connected to a suitable source of alternating current of constant frequency, such for example as commercial 60 cycle current, a fluctuating potential of desired amplitude may be derived by voltage divider 9 and applied between plates 29. The charges thus applied to plates 29 will cause the ray to oscillate back and forth between these plates due to the successive alternating of the polarity of the charges. If now a potential is applied between plates 30 also, then the path of the cathode ray instead of being a substantially straight line between plates 29 will be modified to give a path taking the form of a closed figure.

Let us assume now that the unknown and standard pieces $x$ and $s$ are properly positioned with respect to their coil pairs and that switches 6, 24 and 33 are closed. The voltage across supply lines 8 being supplied to transformer 4 will result in a certain voltage being set up across secondary 3. Current will flow in the series-circuit comprising winding 3 and coils 1 and 2 and opposing voltages will be set up across coils 1 and 2. It is essential that the coils be designed so that the opposing voltages will be substantially equal if the magnetic cores are similar. The coils will preferably be identical with each other, but this is not necessary so long as the above stated condition is fulfilled. If pieces $x$ and $s$ are of identical physical and chemical characteristics, the voltages induced across coils 11 and 12 will be exactly equal and since they oppose each other, they will neutralize each other. As a consequence, substantially no current will flow in the circuit comprising these coils and no energy will be applied to tube $v$.

If, however, there is any difference between the characteristics of pieces $x$ and $s$, such difference will be reflected in the opposing voltages induced across coils 11 and 12 and a resultant voltage will be applied to transformer 14, the amplitude of which will be proportional to the difference in characteristics of the two pieces. The resultant voltage will be applied to tube $v$ which serves to amplify it. The amplified resultant voltage will then be applied between plates 30 as above set forth. By viewing screen 31, the path of the cathode ray may be readily ascertained and an observer can determine at once whether or not there is any appreciable difference between the unknown and standard pieces. In the event that they are practically identical, the observer will see a substantially straight line or flat closed figure as the image pattern representing the ray path. On the other hand, any difference in the characteristics of the pieces will divulge itself in the image pattern appearing on screen 31.

Figure 2:
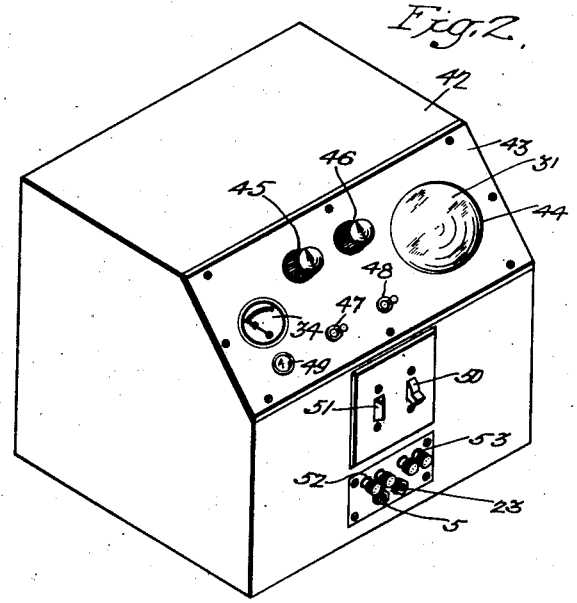
Fig. 2 is a perspective view of the main cabinet or housing of the device which houses certain essential elements of the system.
Figure 3:
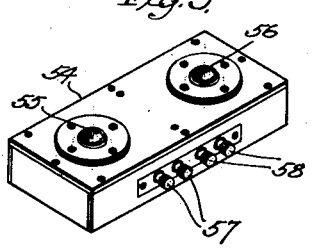
Fig. 3 is a perspective view of a preferred form of pick-up device.

In Figs. 2 and 3, there is illustrated the preferred form of the device with the constituent elements thereof assembled in compact form. Referring to Fig. 2, the cabinet or housing 42 contains all of the elements of the system, as illustrated in Fig. 1, excepting the coil pairs 1, 2 and 11, 12. The casing is preferably provided with a sloping front panel 43, and the cathode ray tube is supported within the casing so that the flared end thereof and screen 31 lies substantially flush with panel 43 in a window opening 44 thereof. Thus, an operator may readily observe the image patterns formed on the screen. Operating knobs 45 and 46 control the voltage divider 9 and the control rheostat of the cathode ray filament respectively. The volt meter 34 is mounted on panel 43, as clearly illustrated. Switches 16 and 33 are mounted on panel 43 and controlled by operating knobs 47 and 48, respectively. A double push button switch is preferably used to combine switches 6 and 24, the operating button of such switch being illustrated at 49. A line switch 50 for controlling the supply of energy to lines 8 is mounted on the front vertical panel of the cabinet and pilot light 10 is mounted behind lens 51.

In order that the system may be controlled by the operator by means of a foot-operated switch (not shown) if desired, the jacks 5 and 23 above described are mounted together on the front vertical panel of the cabinet. By plugging suitable connecting conductors leading to a foot-operated switch into these jacks, the system may be controlled in this fashion. Two pairs of binding post terminals 52 and 53 are also provided on the front panel of the cabinet for connection to the pick-up coil assembly now to be described.

In cases where the pieces to be tested and the standard piece take the form of small elements, such as bolts, screws and the like, I prefer to mount the inductively related coil pairs 1, 11 and 2, 12 in a single casing 54, as illustrated clearly in Fig. 3. The coils (not visible) are mounted inductively within this casing so as to provide common air cores or spaces 55 and 56 into which the unknown and standard pieces may be inserted. Two sets of binding post terminals 57 and 58 are provided for connection to the main cabinet above described.

Figure 4:
Figs. 4 to 8 illustrate image patterns of five different pieces of metal, indicating clearly the differences of the characteristics thereof.
Figure 5:
Figure 6:
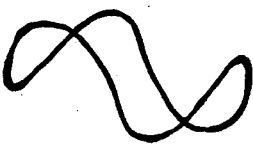
Figure 7:
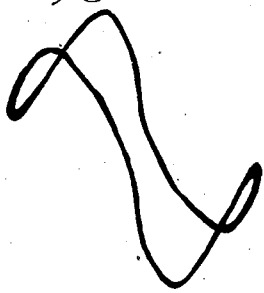
Figure 8:
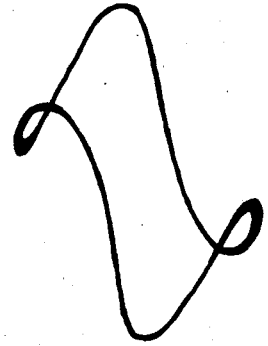

The illustrations of Figs. 4 to 8 represent actual image patterns which were photographed from screen 31 during the testing of five pieces of steel. They reveal differences in the characteristics of the tested pieces from the standard piece which were not discernible under a microscope operated to give a thousand times magnification. It will be noted that Figs. 4 and 5 are somewhat similar, but nevertheless there is a distinct difference between them. The piece whose test is represented by Fig. 4 differed more widely from the standard piece than did that represented by Fig. 5. This is evidenced by the greater lateral movement of the ray from a substantially straight line as shown by Fig. 4. Fig. 6 shows that the piece under test differed further in its characteristics from the standard piece and Figs. 7 and 8 show further differences in the characteristics of the pieces under test.

These illustrations show that pieces of similar or like physical and chemical characteristics will give substantially the same image pattern. Moreover, the exact characteristics, such as hardness, brittleness, etc., cause the images to take certain forms which may be readily recognized. Thus, an observer may determine at once the exact characteristics of any particular pieces which he wishes to test. The system is very useful in many instances as will be quite apparent. It is particularly useful in the testing of aeroplane and automobile parts where the highest degree of accuracy and precision is required. In many instances, pieces taken from the same lot vary widely in their characteristics. This is ofttimes true even though the entire lot has been subjected to the same treatment. By means of the present system, it is possible to quickly segregate the pieces comprising the lot according to their exact characteristics. It is also possible, of course, to pick several pieces at random from a lot and test them to see whether or not they as representatives of the lot have the desired characteristics. By virtue of its sensitivity and accuracy in giving a clear visual indication of the characteristics of a piece of metal, this system saves time, money and energy. In many instances, it has heretofore been necessary to scrap a lot of metal pieces even though some of them were satisfactory simply because it was impossible or impractical to separate the good from the bad pieces. The present system eliminates such wasteful practice by enabling the salvaging of the good pieces in a practical manner. The simplicity of operation of the system is an important feature because it makes it possible for anyone to operate it.

In the preferred form of the invention, potentiometer 9 is given a value of 1000 ohms. The voltage of source 19 applied to the cathodes is 6 volts, while that of source 18 is 4.5 volts. The voltage of source 20 is 300 volts and a potential of 90 volts is applied to the plate of tube V. The resistor included in the cathode-anode circuit of the cathode ray tube has a value of 2000 ohms, while the resistor in the circuit of cathode 27 has a value of 2.5 ohms. The capacity of condenser 15 is 2 microfarads. The purpose of this condenser is to enable a variation in the image pattern, when desired, by closing switch 16. Obviously by assigning a proper value to the condenser it may be made serve as a filter or by-pass element to eliminate harmonies or high frequencies or it may constitute with winding 13 a resonant or tuned circuit. The values above given may of course be varied without departing from the invention.

Although a single preferred embodiment of the invention has been described, it will be apparent that various modifications are possible and may be made without departing from the spirit and scope of the invention.

I claim:

1. A portable device for determining the characteristics of a metal piece by comparison with a metal piece of known characteristics, comprising a coil unit and a housing unit, said coil unit comprising a casing, a pair of serially connected coils within said casing, a pair of serially connected opposed coils within said casing and inductively associated respectively with said first coils, each pair of inductively associated coils being mounted in said casing so as to provide an air core or space into which a metal piece may be inserted, and terminals on said casing for connection to said coils, said housing unit comprising a cabinet or housing, a cathode ray tube with two sets of ray deflecting plates within said cabinet, a screen visibly mounted on said cabinet in the path of the cathode ray, circuits for connecting said opposed coils to one set of said ray deflecting plates, circuits for connecting the other coils to a source of potential, circuits for connecting the other set of ray deflecting plates to said source, and terminals on said cabinet for said circuits.

2. A portable device as set forth in claim 1, said housing unit further comprising circuit control switches shunted by jacks mounted on said cabinet for optional use of foot-operated switches.

HOWARD T. HALLOWELL, Jr.